United States Patent
Huettner et al.

(10) Patent No.: US 10,649,431 B2
(45) Date of Patent: May 12, 2020

(54) CONTROL SYSTEM FOR ELECTRICALLY CONTROLLED INSTALLATIONS

(71) Applicant: KEBA AG, Linz (AT)

(72) Inventors: Christian Huettner, Linz (AT); Bernhard Lehner, Hirschbach (AT)

(73) Assignee: KEBA AG, Linz (AT)

( * ) Notice: Subject to any disclaimer, the term of this patent is extended or adjusted under 35 U.S.C. 154(b) by 107 days.

(21) Appl. No.: 15/773,600

(22) PCT Filed: Oct. 28, 2016

(86) PCT No.: PCT/EP2016/076066
§ 371 (c)(1),
(2) Date: May 8, 2018

(87) PCT Pub. No.: WO2017/076765
PCT Pub. Date: May 11, 2017

(65) Prior Publication Data
US 2019/0079482 A1    Mar. 14, 2019

(30) Foreign Application Priority Data

Nov. 6, 2015   (AT) .............................. A 50951/2015

(51) Int. Cl.
*G05B 19/042*     (2006.01)
*B25J 13/06*      (2006.01)
(Continued)

(52) U.S. Cl.
CPC ........ *G05B 19/0425* (2013.01); *B25J 13/006* (2013.01); *B25J 13/06* (2013.01);
(Continued)

(58) Field of Classification Search
CPC ................. G05B 19/0425; G05B 9/02; G05B 2219/49137; G05B 2219/40197;
(Continued)

(56) References Cited

U.S. PATENT DOCUMENTS

| | | |
|---|---|---|
| 7,528,710 B2 | 5/2009 | Halfmann et al. |
| 8,344,848 B2 | 1/2013 | Moeschl et al. |
| 9,079,317 B2 | 7/2015 | Preisinger et al. |
| 2005/0141681 A1 | 6/2005 | Graiger |

(Continued)

FOREIGN PATENT DOCUMENTS

| | | |
|---|---|---|
| AT | 10 676 U1 | 8/2009 |
| EP | 1 655 645 A2 | 5/2006 |

(Continued)

OTHER PUBLICATIONS

International Search Report of PCT/EP2016/076066, dated Jan. 23, 2017.

*Primary Examiner* — Jingneshkumar C Patel

(74) *Attorney, Agent, or Firm* — Collard & Roe, P.C.

(57) ABSTRACT

The invention relates to a control system for electrically controlled installations, comprising at least one electronic control apparatus and at least one portable, mobile manual held operating unit, and a wireless communication connection between the at least one control apparatus and the manual held operating unit. Furthermore, at least one material coupling means, flexible in terms of form, with a restricted maximum longitudinal extent is provided for selectively establishing and releasing a physical link between the manual held operating unit and a machine-side coupling counterpart. The control system is embodied to release or block supervisory-relevant control commands depending on a coupling state and/or a linkage state of the coupling means.

25 Claims, 3 Drawing Sheets

(51) Int. Cl.
*B25J 13/00* (2006.01)
*G05B 9/02* (2006.01)
*B25J 19/06* (2006.01)

(52) U.S. Cl.
CPC ............. *B25J 13/065* (2013.01); *B25J 19/06* (2013.01); *G05B 9/02* (2013.01); *G05B 19/0423* (2013.01); *G05B 2219/33192* (2013.01); *G05B 2219/39384* (2013.01); *G05B 2219/40197* (2013.01); *G05B 2219/49137* (2013.01)

(58) Field of Classification Search
CPC ........... G05B 2219/39384; G05B 2219/33192; G05B 19/0423; G05B 2219/36542; G05B 2219/33235; G05B 2219/36159; G05B 19/418; B25J 13/065; B25J 13/006; B25J 19/06; B25J 13/06
USPC .......................................................... 700/17
See application file for complete search history.

(56) References Cited

U.S. PATENT DOCUMENTS

| | | | | |
|---|---|---|---|---|
| 2006/0015757 | A1* | 1/2006 | Tupman | G06F 1/266 713/300 |
| 2006/0271209 | A1* | 11/2006 | Calcagno | G05B 19/42 700/19 |
| 2009/0069943 | A1 | 3/2009 | Akashi et al. | |
| 2011/0010006 | A1* | 1/2011 | Tani | B25J 9/1674 700/245 |
| 2011/0160910 | A1* | 6/2011 | Preisinger | B25J 13/06 700/275 |
| 2014/0367523 | A1* | 12/2014 | Kitazawa | B64G 1/32 244/158.4 |
| 2017/0072567 | A1* | 3/2017 | Carter | B25J 9/1692 |

FOREIGN PATENT DOCUMENTS

| | | |
|---|---|---|
| EP | 1 866 712 B1 | 6/2012 |
| WO | 03/088011 A2 | 10/2003 |

* cited by examiner

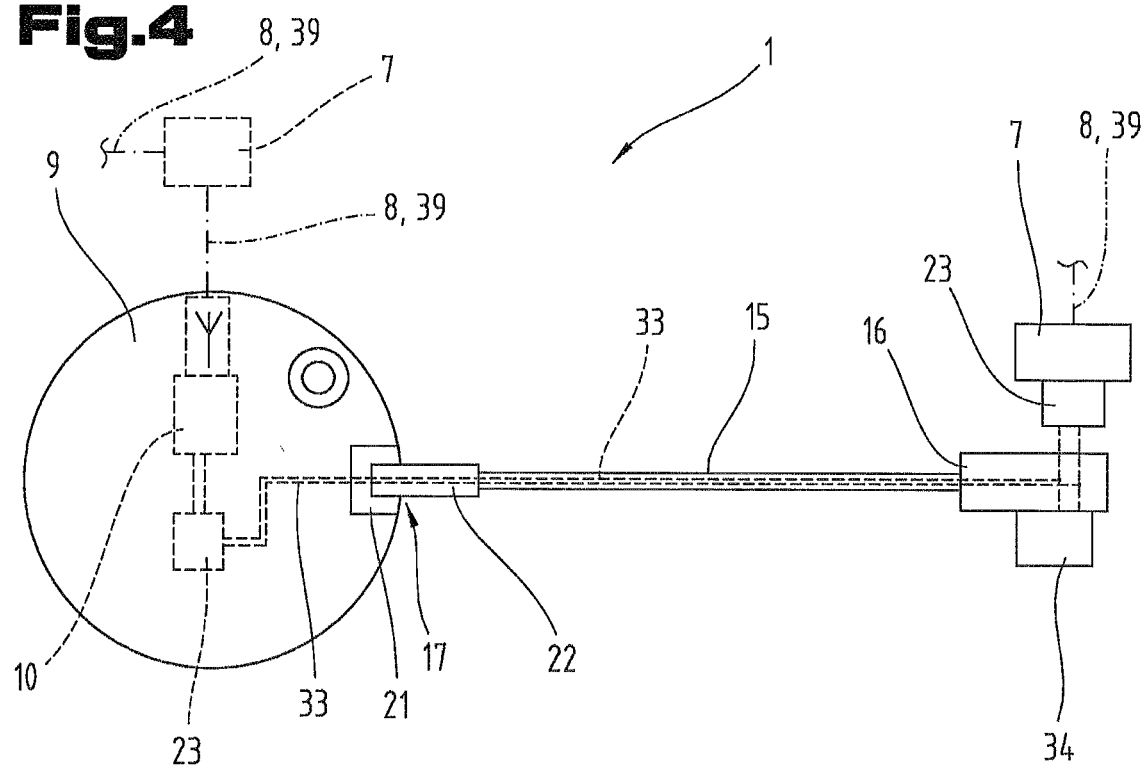
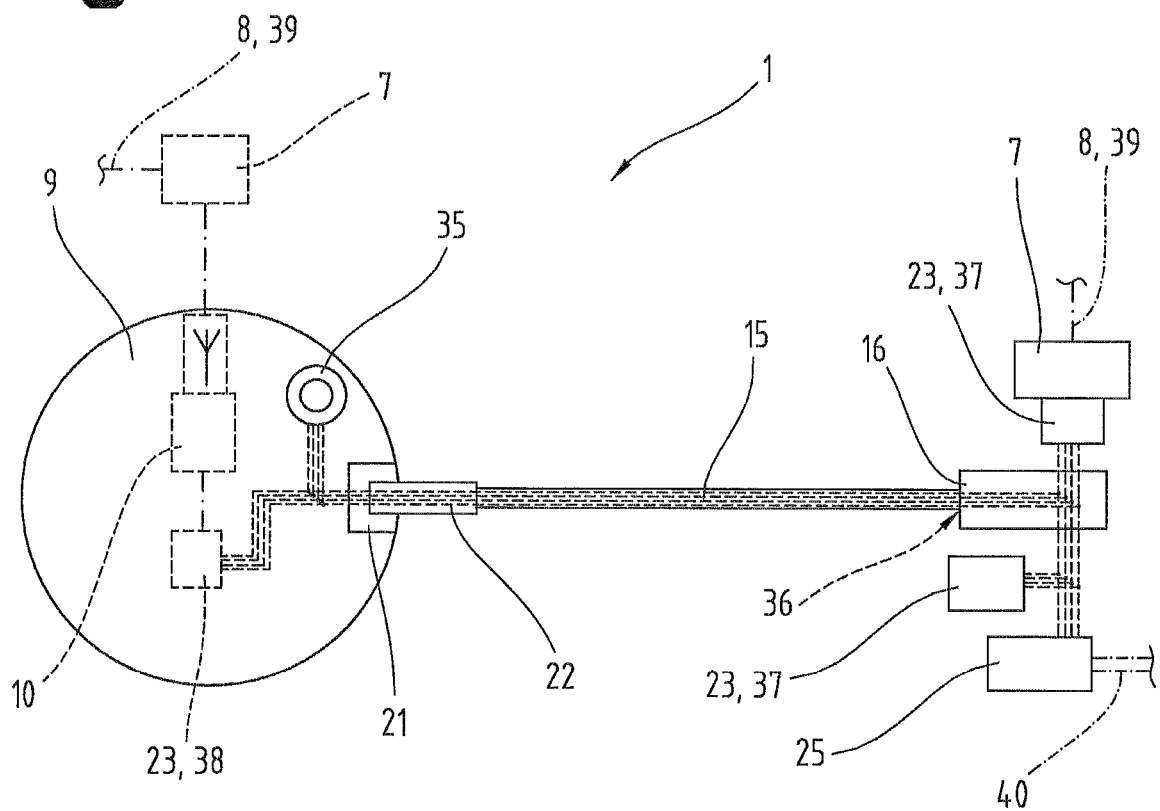

CONTROL SYSTEM FOR ELECTRICALLY CONTROLLED INSTALLATIONS

CROSS REFERENCE TO RELATED APPLICATIONS

This application is the National Stage of PCT/EP2016/076066 filed on Oct. 28, 2016, which claims priority under 35 U.S.C. § 119 of Austrian Application No. A50951/2015 filed on Nov. 6, 2015, the disclosure of which is incorporated by reference. The international application under PCT article 21(2) was not published in English.

The invention relates to a control system for electrically controlled installations.

Nowadays in industrial practice fully-automated or at least partly-automated processes are used increasingly for the manufacture of products or semi-finished products for example. It is usual in this case at a production site to combine a plurality of similar and/or different, electrically controllable machines, to enable the most efficient process sequences and thus the most economical production. Here for example machine tools, transport devices, robots and additional installation components or machines can be used in combination.

Such electrically controlled installations or installation components can here use different modes of operation. Generally these kinds of industrial installations or installation components are mostly operated in a so-called automatic mode in which a fully automated, program-controlled mode of operation is performed without the active participation of a human operator, or a person is required to carry out monitoring tasks when process sequences are carried out in automatic mode.

For certain process sequences and on particular occasions fully-automated operation management is unsuitable or even unachievable, and such process sequences have to be performed in semi-automated or even manual operation modes of the installation or installation component. A semi-automatic or manual operation mode may be necessary for example when putting into operation a new installation component or machine, when setting up a new tool, when teaching robots, when positioning machine axes, when correcting faults, or during maintenance or repair work.

In most industrial installations the configuration of the installation components or machine components, or the type of process management used is such that energies, forces, masses, movements, materials etc. are involved which in principle can represent a potential risk to people's health or even their lives. Usually areas of an installation or machine, which are potentially dangerous for people, are safeguarded by various safety devices, such as floor markings, monitored safety fences, barriers, safety doors and the like. At least for the fully-automated operation of installations or installation components such measures mean that secured areas are at least recognizable for people, in many cases people's access may even be obstructed. During semi-automatic operation or manual operation such safety measures often have to be disabled temporarily, or access needs to be allowed to a potentially dangerous area of an installation component, such as for specially trained operators. In particular, this is often necessary as adjustments often have to be made on an installation component during semi-automatic or manual operation, for which a direct assessment, in particular a visual monitoring, of the consequences or effects of the control commands which have been disabled for this and are critical to the monitoring by the relevant operator is advantageous or even essential, for example for the accurate positioning of grippers or tools.

With regard to the provision of status or machine or process information and for the execution of manual operations, increasingly portable manual operating devices are used or seen as desirable, instead of locally fixed display and control panels. Such manual operating devices are usually designed in this case both for displaying status and process information and for the execution or input of settings or for the manual setting of control commands. Depending on the intended purpose such manual control units or devices can comprise a plurality of output and input means, such as graphic displays for displaying information, keypads or touchscreens for making adjustments and inputting control commands, but also multidirectional input elements for control commands, such as input elements designed as joysticks for the direct control or command of adjusting movements or traversing movements of machine axes.

For most common applications wired manual operating devices are used. The signal transmission of status information and the transmission of control and setting commands between the manual control unit and at least one functional, electronic control device for the installation or installation component, and the power supply for the respective manual operating device are hereby performed via the respective wire connection. Such wire-connected manual operating devices or units are configured to remain permanently in the area of the associated installation component or machine or machine component.

From the point of view of safety it is common and often recommended as standard procedure to provide such wired manual control units with manually operable safety switch elements, such as emergency shutdown switches or so-called enabling switches. This is advisable for safety reasons in the above case when an operator is in the danger area of a machine for visually monitoring the effect of set control contends which are critical to the monitoring. In this way if a dangerous situation occurs the operator can stop the adjustment movements immediately or after a minimum delay by activating an emergency shutdown or emergency stop switch for example or can shutdown the relevant installation or machine component.

In order for example to provide greater operating convenience or greater mobility for operators, there is an increasing demand for wireless solutions for manual control units or devices. Such manual control units designed for the wireless transmission of signals in principle satisfy demands relating to operating convenience, in that for example they give an operator access to a maximum number of components of an installation possibly each stopping point at least in the area of the installation, for example via a corresponding communications network. Increasingly, to improve the ease of operation of machines also so-called industry tablets are used which correspond essentially to robustly designed embodiments of known Tablet PCs for private or office use.

The adaptability of modern manual control units or Tablets, in relation for example to the variable arrangement of output and input elements, such as via their graphic touchscreen user interfaces, makes it possible in principle to avoid the usually rigid allocation of a manual operating device to a specific machine or installation component, and increasingly manual control units are preferred which give an operator access to a plurality of installation components or machines to increase the flexibility or operational capability of said manual control units.

However, wireless signal transmissions represent a particular challenge in the area of industrial production, particularly with regard to safety-related issues, in particular personal safety issues. There are also concerns about the sufficient reliability of wireless signal transmission, particularly within wide radio communication networks and the like.

In this connection for example the unambiguous allocation of control commands entered into a manual control unit to a specific machine or machine component is important. This problem is exacerbated in many cases by the fact that in industrial production installations often a plurality of machines or installation components are arranged directly next to one another, which machines are often configured to be similar or even identical to one another.

Furthermore, it is at least helpful or even necessary in principle for specific control commands triggered manually by an operator for the effect(s) of such control commands to be monitored directly by the operator, in particular visually monitored, which requires the operator to be a certain distance from the affected or controlled installation component or machine or machine component. Here for example in wirelessly communicating manual control units the operator should not be allowed to leave the area of the installation component, and intentionally or unintentionally set control commands which need supervision from a distance, in particular control commands which have an increased potential risk. Furthermore, an operator with a manual operating device should still be given freedom of movement, mainly in order to allow the operator or make it easier for the operator to adopt an advantageous assessment or monitoring position in the area of the respective installation component.

In the past solutions to such problems have already been proposed, for example in EP 1 866 712 B1 of the applicant. In EP 1 866 712 B1 methods are disclosed for technically detecting the position of a manual operating device designed for wireless communication relative to an installation system to be controlled or for monitoring the spatial closeness of a manual operating device to the relevant installation. However, there is still room for improvement compared to the solutions disclosed in the prior art with regard to increasing the safety and reliability of such control systems in wirelessly communicating manual operating devices. Furthermore, according to the prior art the physically fully unrestricted freedom of movement of a solely wireless data-coupled manual operating device requires a comparatively large amount of technical input to achieve a safe and also highly accessible operation which means high purchase costs.

The objective of the present invention was to overcome the current disadvantages of the prior art and to provide an improved control system by means of which safety-technical requirements can be met in an inexpensive and reliable manner, and at the same time the flexibility of the manual operating devices used and the freedom of movement of operators is improved.

Said objective is achieved by a control system according to the claims.

The control system provided for electrically controlled installations comprises at least one electronic control device for monitoring and controlling an installation or installation components.

Furthermore, the control system comprises at least one portable, mobile manual control unit for displaying information and for inputting control commands, wherein the manual control unit is equipped with an internal power supply unit to provide a temporary, electric power supply.

Furthermore, a wireless communication connection is formed between the at least one control device and the manual control unit for transmitting information and control commands between the manual control unit and the control device, or corresponding control commands can be provided for the at least one control device.

It is essential that at least one form-flexible, material coupling means with a limited maximum longitudinal extension is provided, which coupling means is provided via at least one coupling device activated without tools for the optional creation and release of a physical bond between the manual control unit and at least one spatially fixed machine-side coupling counterpart.

Furthermore, at least one coupling state monitoring device is designed for the continuous detection and monitoring of a mechanical coupling state of the at least one coupling device and/or for the continuous detection and monitoring of a signaling connection state via the coupling means between the manual control unit and the at least one coupling counterpart.

In this case the control system is designed to release supervisory-relevant control commands, in particular control commands to be monitored directly by an operator in case of detecting a coupled state or an existing connection state, and for blocking supervisory-relevant control commands in case of detecting a released coupling state or an interrupted connection state.

By means of a control system designed in this way a solution is provided which is technically simple to implement and highly effective for enabling the reliable operation of machines or installation components which at the same time is as safe as possible. An improvement in safety, in particular personal safety, is achieved in that the input of supervisory-relevant control commands to the manual control unit is only activated if by means of the at least one coupling state monitoring device an established coupling state of the at least one coupling device or an existing signaling connection state via the coupling means is detected between the manual control unit and the at least one coupling counterpart. Otherwise the input of such supervisory-relevant control commands, in particular control commands whose effect should be monitored directly by an operator or have to be monitored, is blocked by the manual control unit.

In this way it is possible for example to prevent an operator from intentionally or unintentionally triggering supervisory-relevant control commands via the manual control unit, whilst the operator with the manual control unit is remote or outside the range of vision of the relevant installation component, but still within the communication range of the wireless communication connection. In particular, potentially dangerous situations can be avoided by such blind triggering of supervisory-relevant or critical control commands. An advantage is however that an operator during the manual operation of an installation component by triggering supervisory-relevant control commands, on the basis of the enforced closeness to the installation component, can immediately pick up hazardous situations, and can react as rapidly and efficiently as possible to a hazardous situation.

A coupling state monitoring device is defined here to mean any monitoring device, by means of which a connected or linked state of the coupling means can be established in principle. This includes on the one hand both detection means which can distinguish between a formed or activated coupling state of the coupling device and a released or deactivated coupling state of the coupling device. The coupling device can be formed for example by a permanent magnet on the coupling means and a permanent magnet on the manual control unit, which permanent magnets are designed for mutual attraction.

Furthermore, a coupling state monitoring device is also defined as a device which can distinguish in principle between an existing link or connection, for example an electrical connection between the manual control unit and the at least one coupling counterpart, and an interrupted connection between the manual control unit and the at least one coupling counterpart. In this instance the term coupling state monitoring device is defined as synonymous with a linkage state monitoring device.

The logical or programmatic processes for enabling or blocking the control commands can be implemented for example in a control device of the control system, which is designed for monitoring and controlling the installation or installation components. Alternatively, said processes can also be implemented in an additional control device connected by communication-technology to the at least one control device, in particular a safety control or a safety device. It is also possible for said logical, programmatic processes to be displayed in a control device of the at least one manual control unit itself. The blocking of supervisory-relevant control commands can be performed for example by the functional and display-technical blocking of input elements assigned to the corresponding control commands on the manual control unit or a graphic user interface of the manual control unit. Furthermore or additionally, it is also possible however that a control device of the control system designed to receive the corresponding control commands is designed to not covert received supervisory-relevant control commands.

The triggering of control commands, whose effect does not require direct supervision, in particular no direct visual observation by an operator, and data-technical information exchange between the manual control unit and the control device(s) of the installation is by comparison virtually unlimited within the communication range of the wireless communication connection. In this way an operator is able by means of the manual control unit for example to query from almost any position within the range of the wireless communication connection information about the operation or statuses of various installation components, and to display them via the manual control unit. In this way also optionally wireless, data-technical access to a plurality or all installation components is possible from virtually any location. The accompanying, almost unrestricted freedom of movement is mainly advantageous in terms of operating convenience, but also operating efficiency and is generally advantageous with respect to efficiency when monitoring and maintaining a larger number of machines. However, at the same time it is ensured that the operation of installation components or machines or machine components relevant to the monitoring can be triggered via the manual control unit only from the vicinity of the respective installation component, as to activate the relevant supervisory-relevant control commands it is necessary to have a physical connection between the manual control unit and a fixed machine-side coupling counterpart.

By means of the innovative features of the control system there can also be a secure allocation of a manual control unit to a specific coupling counterpart, as by means of the material coupling means in the coupled state a physical connection with a specific coupling counterpart can be perceived directly, in particular visually by the operator. By means of the form-flexible configuration of the coupling means an operator is also given in the coupled state or connected to a coupling counterpart sufficient freedom of movement to adopt an advantageous observation or monitoring position in the area of the coupling counterpart or the corresponding installation component.

According to one development the coupling means has a maximum longitudinal extension, selected from a range of between 2 meters and 25 meters.

By means of the given range for almost all possible types of installations, installation components or machines an adequate solution is provided for an operator with respect to the range of movement so that the latter can be positioned remotely from a coupling counterpart. In some components of an installation in this way shorter ranges of movement can be an advantage, for some components however larger ranges of movement may be advantageous for an operator.

A suitable length for the coupling means should be selected in consideration of requirements such as the visibility of the installation components or machine parts influenced by the operating action, or a minimum distance from the adjacent and confusingly similar machines and/or the required freedom of movement when carrying out the operating actions. For example the length can be such that the operator can see a specific hazard area of an installation or installation component, but cannot enter it while triggering commands relevant to the monitoring via the manual control unit or the operator is forced to maintain a sufficient safety distance from such a hazardous area. Preferably, the coupling means has a maximum longitudinal extension of between 5 meters and 15 meters.

In an advantageous embodiment of the control system it is possible that at least all control commands critical to personal safety are classed as supervisory-relevant control commands.

In this way the safe operation and the safe use of the installation, in particular personal safety, can be improved even further. By means of the compulsory presence of the operator when triggering control commands critical to personal safety in the vicinity of a corresponding installation component, the triggering of the control commands can be omitted when other persons are located in a potentially dangerous area. Furthermore, the operator can immediately become aware of a dangerous situation and undertake suitable steps to mitigate the danger.

According to a further advantageous embodiment the at least one coupling device can be formed by a terminal element formed on the manual control unit and by a connecting element arranged at one longitudinal end of the at least one coupling means and provided for the form-fitting and/or force-fitting connection to the terminal element without the use of tools.

In this way a simple yet efficient embodiment variant is provided for the at least one coupling device. In particular, a coupling device designed in this way allows the direct formation of a connection between the manual control unit and a coupling counterpart. Preferably, a coupling can be formed between the connecting element and the corresponding terminal element without further activating means or without additional action by the operator. The connecting element can be designed here for example as an electric plug and the terminal element as a corresponding socket for the plug, whereby the coupling device would be formed by an electric plug contact.

In this connection it can be advantageous if the coupling state monitoring device is formed by an electric switch contact detection device for detecting a connecting element coupled to the terminal element.

In this way a coupling state monitoring device can be provided which is simple to arrange but is still efficient. By means of a switching contact which can close a circuit for example when coupling the connecting element and can open the corresponding circuit when releasing the connecting element from the terminal element, information can be obtained about the respective coupling state of the coupling device in a simple manner.

However, it may also be practical for the coupling state monitoring device to be formed by a contactless sensor device for detecting the presence and/or the absence of the connecting element on the terminal element.

The advantage of contactless sensor devices or sensors is that the latter can be virtually wear-free and thus can be used reliably for long periods. A further advantage of contactless sensors is that there is no need for a specially precisely fitting mechanical configuration between the terminal element and the connecting element and in this way tolerances are possible. In this way for example also the multiple use of sensor devices already provided in a manual control unit for other purposes, such as for example an installed camera or an NFC interface is possible in principle. Thus it is also possible to use non-adapted safety-technical input/output devices from the consumer sector which are designed in particular for coupling via a coupling means, such as so-called tablets, at least limited to specific operating tasks, for example as a component of a manual control unit.

According to one development the control system comprises a plurality of spaced apart machine-side coupling counterparts, to which electrically controllable installation components or electrically controllable machines or electrically controllable machine components are assigned locally.

In this way a plurality of similar or different installation components of an installation can be monitored and controlled by means of the control system or via the at least one manual control unit. In particular, it is possible to arrange a plurality of spatially fixed coupling counterparts in close range to the associated or corresponding installation components or machines, so that an operator has to move to the respective installation component to trigger control commands critical to the monitoring.

It can be advantageous in this way to assign a material coupling means functionally specifically to at least one of the coupling counterparts, so that the corresponding coupling counterpart and the corresponding coupling means form a functional pair.

A functional adjustment of a respective coupling counterpart to the corresponding installation component can be performed hereby as required in various different ways. This can for example relate to the accessibility of the coupling counterpart or the positioning of the coupling counterpart in the vicinity of manipulation elements fixed onto the installation component, input elements or safety devices for the corresponding installation component. Essentially the type of such a functional adjustment between the coupling counterpart and installation component corresponds to the respective type, functionality and/or embodiment of the respective installation component or machine.

For example it is also possible that the maximum longitudinal extension of a respective coupling means is adjusted with respect to the maximum required or maximum permissible distancing of the manual control unit from the coupling counterpart.

In this way a solution is provided which takes into account that in principle in many components of an installation, mainly with respect to safe operation, shorter movement ranges can be an advantage. However, for other components of the same installation larger movement ranges may be advantageous for an operator.

In a further, advantageous embodiment it is possible that at least one connecting element comprises at least one identifier, which comprises or represents identification data about the respective installation component, machine or machine component assigned to the respective coupling counterpart, and that the at least one coupling state monitoring device or an independent reading device is provided for detecting the identifier and for transmitting the identifier or the identification data to the at least one control device, and in that the control device is designed on the basis of the transmitted identifier or identification data for the allocation and/or release of control commands critical to the monitoring by means of signal or data-technology regarding the respectively identified installation component, machine or machine component.

It is advantageous in this case that for the control system or control device of the control system there is a safe and unambiguous allocation of a manual control unit to a specific coupling counterpart or installation component. In this way the operating safety and reliability can be improved further, as by means of the control system or the at least one control device of the control system it is possible to perform the automated recognition of an installation component or coupling counterpart via the at least one coupling state monitoring device or an independent reading device. Said features enable in particular the safe and unambiguous allocation of wirelessly transmitted control commands, so that when triggering such a control command via the manual control unit the control system can perform the secure allocation of the command to the relevant installation component, for the purpose of addressing. Furthermore, the control system can be designed on the basis of control commands which are valid and can executed for releasing the relevant installation component or supervisory-relevant control commands, and for blocking control commands which are not valid and cannot be executed for the respective installation component. The control system can hereby be designed for continuously monitoring the identifier or the presence of the identifier via at least one coupling state monitoring device or the independent reading device. In one embodiment variant of the coupling device as an electric plug connection identifiers can be designed for example by differently coded connecting elements designed as plugs.

In this connection it can be advantageous if the at least one coupling state monitoring device or an independent reading device is formed by a contactless reading device, and the respective connecting element comprises an identifier which can be read by the reading device.

This enables the simple, economically advantageous and efficient detection of an identifier, which is advantageous particularly for large installations comprising a plurality of installation components or machines. The contactless detectable identifier can be for example in the form of an RFID tag or the like on a coupling means. In this way it is made possible for the control system, via the coupling state monitoring device or the independent reading device, to detect or read complex but unambiguously safe identifiers contactlessly. The advantage of the contactless detection of an identifier is beneficial for example in explosion-proof operating environments in that all housings, in particular a housing of the manual control unit can be designed to be completely closed and gas-tight, and no electrical contacts have to be led outside a housing.

Subsequently, it can be advantageous if the reading device is formed by an optically detecting sensor device, and the respective connecting element comprises an identifier which is readable by means of the optical sensor device.

This represents a particularly reliable embodiment which is not prone to disruption. The reading device or the coupling state monitoring device can in this case be in the form of a barcode reader for example, or an imaging sensor device or optical camera.

Furthermore, it is possible for the control system to be designed on the basis of the transmitted identifier or identification data for automatic or on demand retrievable output of information relevant to the installation component, machine or machine component assigned to the corresponding coupling counterpart on the manual control unit.

In this way on the hand there can be an automated selection or adjustment of the information shown on the manual control unit or an optimized representation of the information on the manual control unit. Furthermore, in this way an operator can be given an additional option for the manual for example visual checking or testing of an proper or correct coupling to a respectively desired coupling counterpart. A simple option for this would be an optical display on the manual control unit, which displays information to the operator about the respective coupling counterpart or installation component or machine assigned to a coupling counterpart.

In a further embodiment the coupling means can be formed by an electricity conducting cable and the at least one coupling device is formed by an electric plug connection.

By means of this embodiment a coupling means and a coupling device are provided which enable, in addition to the physical link between the manual control unit and a coupling counterpart, a continuous electric line connection between the manual control unit and a coupling counterpart.

Subsequently, it is possible that the control system in the presence of a physical link between the manual control unit and the at least one coupling counterpart via the coupling means is designed for supplying electric power to the manual control unit and/or for charging the internal power supply unit of the manual control unit.

In this way a manual control unit coupled to a coupling counterpart can be supplied with power at least during an established coupling state. In this way any problems caused by having empty internal power supply units of the manual control unit can be avoided. The at least one manual control unit for example for triggering supervisory-relevant control commands is coupled or connected to a coupling counterpart. If necessary a manual control unit can thus be used long term without the manual control unit having to be charged in the meantime at a separate charging station or the like.

It can also be advantageous however if the coupling means comprises at least one signal transmission line.

In this way there is also a wired transmission of control commands from the manual control unit to the control device(s) of the installation. The at least one signal transmission line can be formed for example by a light conductor or by an electric conductor. In this way any disruptions relating to the wireless transmission or provision of control commands can be avoided, such as for example disruptions caused by electromagnetic interference fields or the like.

In a further, advantageous development it is also possible that the at least one coupling state monitoring device is designed for continually monitoring an electrically conductive connection and/or for the continuous monitoring of a signal connection between the manual control unit and the at least one coupling counterpart.

By means of this embodiment the control safety can be improved even further, in particular in this way it is possible to prevent attempts to manipulate the control system such as attempts to circumvent the operating range by means of the coupling means. By means of the corresponding configuration of the coupling state monitoring device in principle any unintentional or even deliberate interruptions or damage to the coupling means can be reliably detected. This monitoring option thus represents a further and additional improvement to the simple monitoring of the coupling state of the coupling device. For example, damage to a coupling means running on the ground can be established directly by a vehicle or by fallen objects. It is also possible by means of a coupling state monitoring device or linkage state monitoring device designed in this way to prevent manipulation attempts effectively by severing the coupling means, and the control system can then block or prevent the triggering of supervisory-relevant control commands.

An embodiment variant of the control system can also be advantageous in which it is designed for transmitting a data technical identifier via at least one signal transmission line to the manual control unit, which data-technical identifier includes identification data about the installation component, machine or machine component assigned to the respective coupling counterpart, and the manual control unit is designed on the basis of the transmitted, data technical identifier or identification data for the allocation and/or release of supervisory-relevant control commands via signal and/or data technology relating to the respectively identified installation component, machine or machine component.

In this way for example a control device designed for controlling a specific installation component can transmit directly a data-technical identifier via a corresponding coupling counterpart to the manual control unit, whereupon for example a control device of the manual control unit can be designed for activating supervisory-relevant control commands for said installation component or coupling counterpart. In this way also the universal usability of the manual control unit and at the same time a high degree of operating safety and reliability can be ensured as far as possible. Furthermore, in this way an additional selection step beyond the simple coupling process can be made unnecessary for the user, and in this way also an incorrect assignment resulting for example from an incorrect entry by the user or an error of the operator, for example during a selection of one or more machines, can be prevented reliably.

In this connection it is possible that the manual control unit is designed on the basis of the transmitted data technical identifier or identification data for automatic or on demand retrievable output of information relevant to the installation components, machines or machine components assigned to the corresponding coupling counterpart on the manual control unit.

In this way, an optimal configuration of the output or display elements of the manual control unit can be performed or carried out with respect to a respective coupling counterpart.

In one development of the control system however it is also possible that if there is a physical and signaling connection via the at least one coupling means between the manual control unit and a coupling counterpart for transmitting the supervisory-relevant control commands from the manual control unit to the at least one control device via the at least one coupling means and the coupling counterpart.

In this preferred embodiment the supervisory-relevant control commands can be transmitted via a secure signal path which is more reliable than a wireless transmission or provided for the at least one control device. Particularly for the wireless transmission of control commands interference can result in delays to the transmission. Such transmission or delivery delays can be prevented by having wired transmission via the coupling means and the coupling counterpart. In particular this has advantages with regard to the manual operation of installation components in real-time conditions, such as for example when teaching robots, or when setting up machine tools. For such manual operation actions or processes in real-time conditions a direct reaction to a set or triggered control command is at least desirable if not necessary. This relates for example to the movements or adjustments of a machine component which have to be performed at the same time as activating an operating element. Furthermore, it can be ensured by this embodiment of the control system in a technically simple manner that the supervisory-relevant control commands can be implemented without confusion to control the installation component, machine or machine component assigned to the corresponding coupling counterpart. The reason for this is in particular that by means of the coupling means there is a clear, signaling point-to-point connection for transmitting the supervisory-relevant control commands between the manual control unit and the corresponding coupling counterpart.

It can be advantageous here if the control system is designed for transmitting the control commands using a real-time bus protocol and/or by using a safety-oriented bus protocol.

In this way the transmission or delivery efficiency or reliability can be improved further by the coupling means. Additionally, in this way the number of signal lines required in the coupling means can be reduced as far as possible.

In a preferred development the manual control unit can comprise at least one manually triggerable safety switching element, and the control system is designed in the case of a physical and signaling connection by way of a coupling means between the manual control unit and the coupling counterpart and on the manual triggering of the safety switching element for transmitting a safety signal via the coupling means and the coupling counterpart from the manual control unit to the at least one control device or to a separately designed safety device.

By means of this embodiment of the control system a connection is provided between safety switching elements essential to the safety of persons in a particularly reliable and fail-safe manner. Furthermore, effective means are provided for an operator by the safety switching element(s) on the manual control unit, by means of which the operator can react rapidly and effectively to any hazardous situations. Any complex and technically demanding solutions for the wireless transmission or delivery of the signals of the safety switching elements, for example to the at least one control device via the wireless communication connection can hereby be dispensed with. To receive the safety signals in particular also at least one so-called safety control of the control systems can be provided which can be designed according to the respective safety standards. By means of the unambiguous and clear point-to-point connection between the manual control unit and the coupling counterpart via the coupling means it can also be ensured that the safety switching element(s) of the manual control unit can operate on activation by the operator on the correct and intended installation component or machine or machine component. In the case of a so-called emergency-shutdown, emergency-stop, or emergency-stop switching elements the signaling connection can be formed by a coupling means between the manual control unit and the coupling counterpart, in particular by a safety circuit, which safety circuit, can be designed to be dual-circuit redundant.

Furthermore, it is also possible in this case that the at least one coupling state monitoring device is designed for the continuous monitoring of the proper signal connection between the safety switching element of the manual control unit and the at least one control device or between the safety switching element of the manual control unit and the separately designed safety device.

In this way it also possible to improve the operating safety and in particular personal safety further, as it can be ensured by means of the control system that the supervisory-relevant control commands are only activated or enabled when the safety switching elements of the manual control unit are connected via the coupling means in a signaling manner to the at least one control device or the separately designed safety device, and are thus functionally effective.

In this case it is possible that the coupling state monitoring device comprises at least one safety circuit, which is designed for the periodic short-circuit and cross-fault checking of the proper signal connection between the safety switching element of the manual control unit and the at least one control device or between the safety switching element of the manual control unit and the separately designed safety device.

In this way an effective embodiment variant of a coupling state monitoring device is provided. A coupling state monitoring device designed in this way can comprise for example a safety circuit on the coupling counterpart, which is designed for periodically performing a short-circuit and cross-fault check. The coupling state monitoring device can also comprise an additional safety circuit on the manual control unit or on the coupling device, which is designed for checking or detecting the short-circuit and cross-fault check performed periodically by the safety circuit on the coupling counterpart. The control system or a control device or a safety device of the control system can be designed in the case of a negative test result from a short-circuit and cross-fault check to block the supervisory-relevant control commands.

An alternative development can also be advantageous in which the at least one coupling means is formed by a signal-technical inactive means, in particular by a cord, a line, a band or a rope.

By means of such an embodiment of the coupling means with minimal technical effort it is possible to essentially improve the operating safety of the control system. In particular, the coupling means can be designed in this way to be very light, highly flexible and robust at the same time, which particularly for longer operating processes improves the ergonomics significantly compared to a cable connection.

In a further embodiment it is also possible that the at least one coupling counterpart comprises a receiving device for the coupling means.

In this way it is possible to provide an effective and space-saving solution for the coupling means on the coupling counterpart. Furthermore, in this way it is possible to achieve a further improvement with regard to preventing any confusion when assigning a coupling means to a coupling counterpart. By means of the receiving device it is also possible to achieve a controlled accommodation or storage of the coupling means on the coupling counterpart, whereby damage can be prevented, for example to coupling means lying in a disordered manner.

Lastly, with such an embodiment it is also possible that the receiving device is formed by a winding device, which comprises a spring stored-energy mechanism or an electric motor drive for winding the coupling means.

In this way it is possible to achieve a particularly controlled and efficient accommodation of a coupling means. Furthermore, a power-assisted winding process for a coupling means can be performed, and this makes things easier for an operator.

For a better understanding of the invention the latter is explained in more detail with reference to the following figures.

In a much simplified, schematic representation:

FIG. 4 shows a section of a further embodiment for components of the control system;

FIG. 5 shows a section of a further embodiment for components of the control system.

Figure 1:
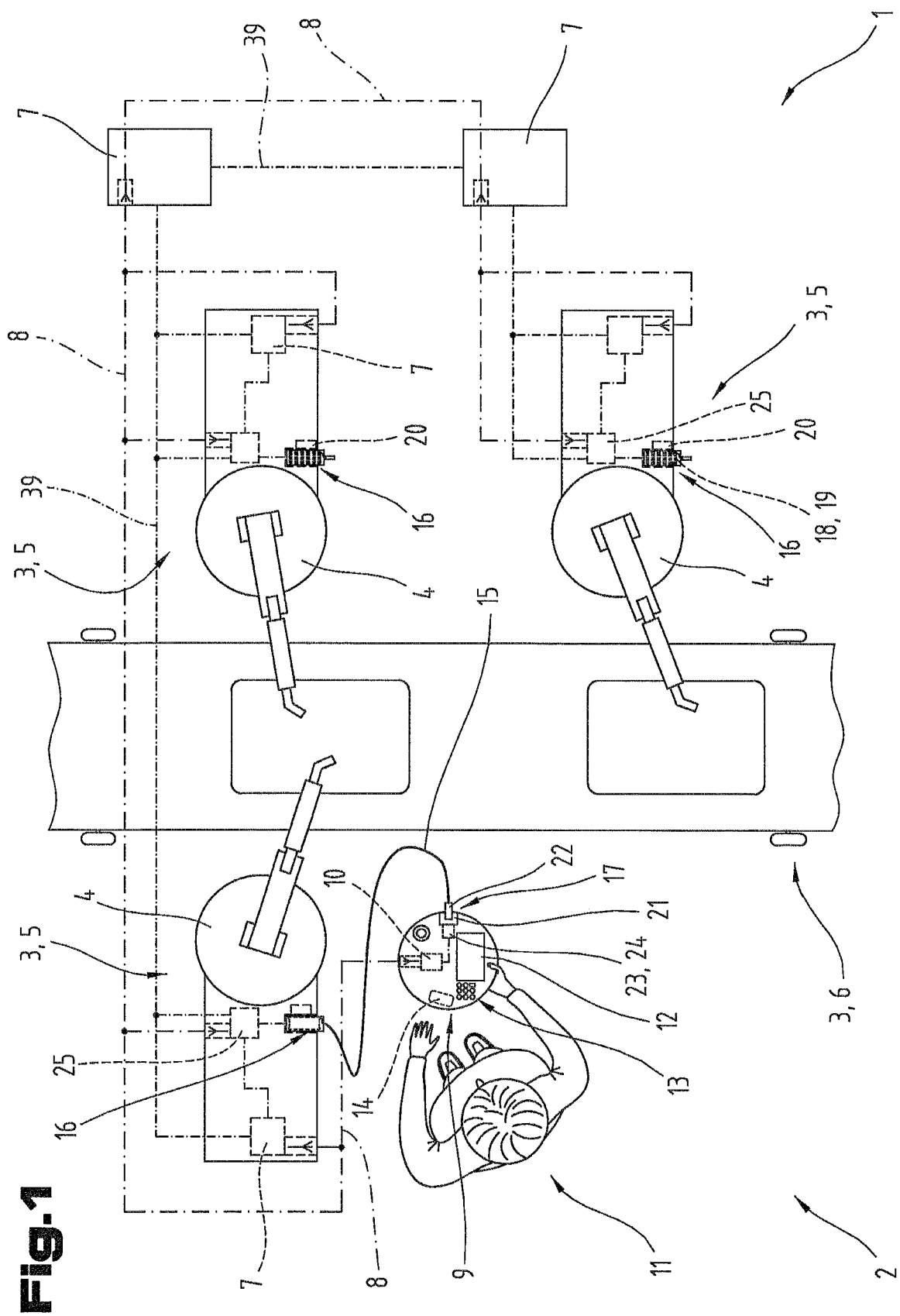
FIG. 1 is an embodiment of a control system and components of an installation controlled electrically by the control system.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows components of a control system 1 and an installation 2 controlled by the control system 1. The partially represented technical installation 2 comprises a plurality of installation components 3, which can be formed in the example according to FIG. 1 by processing stations 5 comprising industrial robots 4. In principle, a technical installation 2 can comprise any additional installation components 3 in order to execute or perform technical processes, for example production processes, chemical processes and the like at least partly in an automated manner. For example the installation 2 shown in the example embodiment of FIG. 1 comprises a transport device 6 for transporting objects, workpieces, semi-finished products and the like between the processing stations 5 or for delivering objects for the processing stations 5.

As shown in FIG. 1, the control system 1 comprises at least one electronic control device 7. As known in principle and is nowadays usual, the at least one control device 7 can also be a component of a control network with a plurality of decentrally arranged control devices 7, as also indicated schematically in FIG. 1. The individual control devices 7 can hereby be formed or programmed to perform specific tasks, for example for monitoring and controlling the installation 1 or for monitoring and controlling specific installation components 3, wherein the control architecture for monitoring and controlling the installation 2 can have any topology in principle.

As necessary the individual control devices 7 for this can be designed for wired and/or wireless communication via wireless communication connections 8, as also indicated schematically in FIG. 1. Such a wireless communication connection 8 can be formed for example by a WLAN or Bluetooth standard connection.

The control system 1 also comprises at least one portable, mobile manual control unit 9. The at least one manual control unit 9 or a control device 10 of the manual control unit 9 can be connected by signal or data technology via a wireless communication connection 8 to one or more of the control devices 7 of the control system 1. The at least one manual control unit 9 is provided and designed to be used by an operator 11, wherein in principle a signal exchange or data exchange is possible between the manual control unit 9 and a control device 7 via the wireless communication connection 8. Of course, between the individual control devices 7, 10 also wired communication connections 39 can be provided in addition.

In principle the control device(s) 7 can be functional control device(s) 7 of an installation or installation component 3, which are designed for example for converting automatically transmitted control commands or control commands input or triggered on the manual control unit 9. Such control devices 7 can be designed for example for controlling actuators or drives for specific installation components 3. However, of course additional control devices 7 can be provided, also for example superordinate control devices 7, which perform for example logistical or power supplying processes or transmission processes between individual installation components 3 in an automated or partly automated manner. Preferably, the at least one manual control unit 9 is communication-connected to at least one functional control device 7 of the control system 1 by means of signal or data technology.

In the context of this document the transmission of signals also relates in principle to the delivery of signals.

For displaying information the at least one manual control unit 9 comprises at least one output element 12, for entering settings and/or for manually triggering control commands the manual control unit can comprise input elements 13. The exact embodiment of the output elements 12 and the input elements 13 of the at least one manual control unit 9 can be adapted to the respective requirements and needs or the respective application. For the purpose of providing a temporary, electric power supply the manual control unit 9 also comprises an internal power supply unit 14.

In the control system 1 at least one form-flexible, material coupling means 15 is provided with a limited, maximum longitudinal extension. As shown in FIG. 1, the control system 1 also comprises at least one spatially fixed machine-side coupling counterpart 16, wherein the control system 1 in the example embodiment according to FIG. 1 comprises a plurality of spaced apart machine-side coupling counterparts 16. Hereby electrically controllable installation components 3 or electrically controllable machines or electrically controllable machine components are assigned close to the coupling counterparts 16. In the example embodiment shown in FIG. 1 a coupling counterpart 16 is assigned to each processing station 5.

Furthermore, at least one coupling device 17 activated without the use of tools is formed by means of which coupling device 17 an operator 11 can optionally or potentially form a physical link between the manual control unit 9 and at least one fixed positioned machine-side coupling counterpart 16 or can disconnect a formed, physical link. In the preferred example embodiment according to FIG. 1 the coupling device 17 is arranged on the manual control unit 9 and the coupling means 15 is fixed on the machine side to the coupling counterpart 16. Alternatively, also on the machine-side coupling counterpart 16 an additional coupling device can be provided for coupling the coupling means 15 to the coupling counterpart 16.

In particular with a coupling means 15 connected securely to a coupling counterpart 16 it is possible for a material coupling means 15 to be assigned functionally specifically to the coupling counterparts 16, so that the corresponding coupling counterpart 16 and the corresponding coupling means 15 form a functional pair, as also shown with reference to the embodiment shown in FIG. 1. In this way a respective coupling means can be configured according to the requirements for a respective coupling counterpart 16. Examples of such functional alignments or configurations of a coupling means 15 and a coupling counterpart 16 are explained in more detail in the following with reference to examples.

Depending on the requirements of a respective coupling counterpart 16 a coupling means 15 can be formed in a simple embodiment for example by a signal-technical inactive means, in particular by a cord, a line, a band or a rope. As indicated schematically in FIG. 1 in the established coupling state of the coupling device 17 by means of the coupling means 15 the maximum distance within which the operator 11 can move the manual control unit 9 or can move away from the coupling counterpart 16 can be limited by the longitudinal extension of the coupling means 15. The maximum longitudinal extension of a coupling means 15 can be freely selected in principle and if necessary adjusted to a maximum required or maximum permissible spacing of the manual control unit 9 from the coupling counterpart 16 for a specific coupling counterpart 16 or installation component 3.

It is advantageous here if on the one hand the maximum distance of the manual control unit 9 from a respective coupling counterpart 16 is limited by the coupling means 15 in the coupling state of the coupling device 17, so that the operator 11 when operating the respective installation component 3 can detect by sensor with the manual control unit 9 the corresponding installation component 3, in particular can visually inspect the latter. On the other hand, there should also be sufficient freedom of movement for the operator 11 even in a coupling state of the coupling device 17, in order for example to adopt an advantageous inspection position with the manual control unit 9. A coupling means 15 can have for example a maximum longitudinal extension selected from a range of between 2 meters and 25 meters. Preferably, a coupling means 15 has a maximum longitudinal extension of between 5 meters and 15 meters.

For storing coupling means 15 of FIG. 1 fixed in particular to a respective coupling counterpart 16 a respective coupling counterpart can comprise a storage or holding device 18 for the coupling means 15, in which holding device 18 a coupling means 15 can be accommodated and maintained in a controlled manner. For example the storage or holding device 18 can be formed by a winding device 19. Such a winding device 19 can be activated manually in this case for example. Preferably, a winding device 19 is designed or used which comprises a spring stored-energy mechanism or an electric motor drive 20 for winding the coupling means 15.

The coupling device 17 activated without tools, by means of which the coupling means 15 can be coupled to produce a physical link between the manual control unit 9 and a coupling counterpart 16, can be designed in principle in many different ways. For example a coupling device can be formed by a permanent magnet on the coupling means and a permanent magnet on the manual control unit, which permanent magnets are mutually attracted to one another. In the embodiment shown in FIG. 1 the at least one coupling device 17 is formed by a terminal element 21 formed on the manual control unit 9, and by a corresponding connecting element 22 arranged at a longitudinal end of the at least one coupling means 15 and provided for the form-fitting and/or force-fitting connection to the terminal element 21 without the use of tools. In this way the connecting element 22 can be designed for example as a plug, and the terminal element 21 can be designed for example as a corresponding socket for the plug.

In the control system 1 shown in FIG. 1 also a coupling state monitoring device 23 is formed. Such a coupling state monitoring device 23 can be designed here for the continuous detection and monitoring of a mechanical coupling state of the at least one coupling device 17. In addition or alternatively a coupling state monitoring device 23 can also be designed for the continuous detection and monitoring of a signal technical connection state by the coupling means 15 between the manual control unit 9 and the at least one coupling counterpart 16. Examples of different, possible embodiments of coupling state monitoring devices 23 are explained in the following with reference to embodiments. Of course, in principle also a plurality of coupling state monitoring devices 23 can be provided.

For example the coupling state monitoring device 23 can be formed by a switch contact detection device 24, as shown schematically and in a much simplified form in FIG. 1. Such a switch contact detection device 24 can be designed for example for detecting a switching state of a circuit, which circuit can be opened or closed respectively by a switching contact assigned to the terminal element 21 when coupling the connecting element 22 or when uncoupling/disconnecting the connecting element 22. A corresponding switching contact can close the circuit for example when coupling the connecting element 22 and can open the circuit when disconnecting the connecting element 22, so that by detecting the switching state via a coupling state monitoring device 23 designed as a switch contact detection device 24 in a simple manner information can be received about the respective coupling state of the coupling device 17. For the signaling transmission of the detected coupling state of the coupling device 17 the at least one coupling state monitoring device 23 can be connected by signaling for example to the control device 10 of the manual control unit 9, as indicated in FIG. 1.

It is essential in the present control system 1 that it is designed for enabling supervisory-relevant control commands, in particular control commands to be monitored directly by an operator 11 on detecting a coupling state or an existing connection state, and for blocking supervisory-relevant control commands on detecting a disconnected coupling state or an interrupted connection state.

The logical or programmatic technical processes for enabling or blocking the control commands can be implemented for example in a control device 7 of the control system 1, which is designed for monitoring and controlling the installation or installation components. Alternatively, said processes can also be implemented in an additional control device connected by signal or data technology to the at least one control device 7, in particular a safety control or a safety device 25 for an installation component 3, as shown schematically in FIG. 1. In principle however it is also possible that said logical, programmatic processes for enabling or blocking supervisory-relevant control commands are displayed in the control device 10 of the at least one manual control unit 9. The safety device(s) 25 can be connected by cable to the control devices 7, 10 or can be wirelessly connected.

The control system 1 can be designed in principle to class all of the control commands critical to personal safety as supervisory-relevant control commands.

Figure 2:
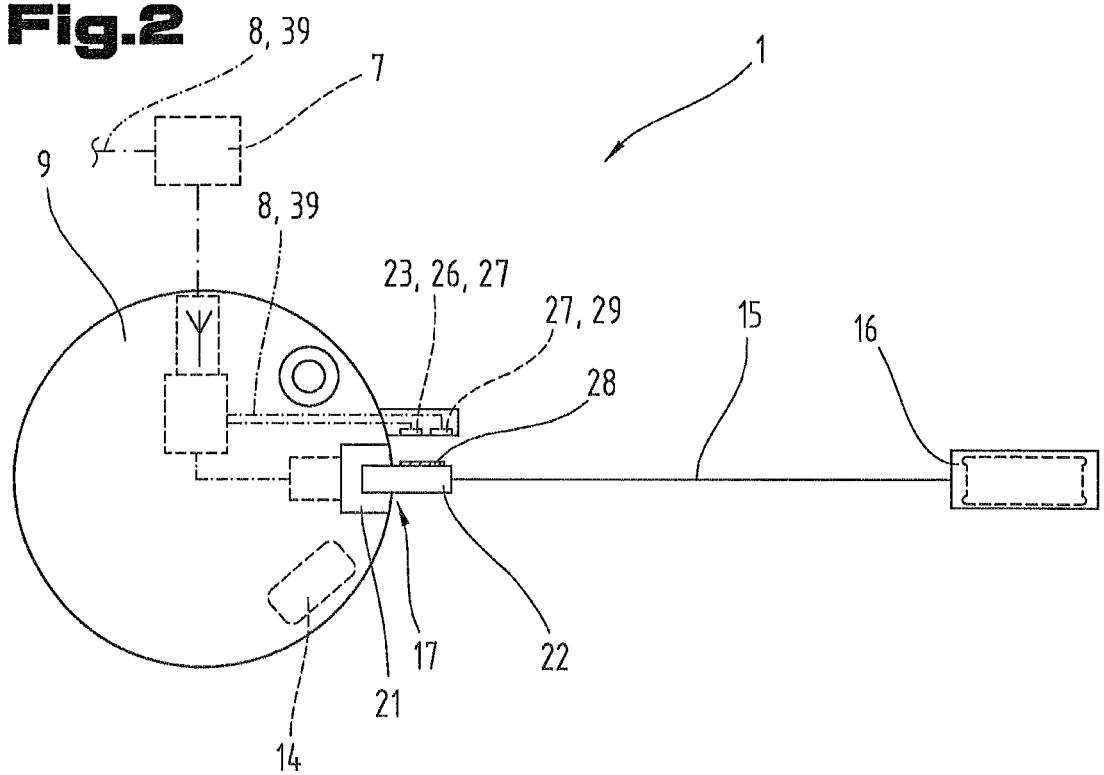
FIG. 2 shows a section of a further embodiment for components of the control system.

FIG. 2 shows a section of an additional and possibly independent embodiment of the control system 1, wherein the same reference numerals and component names are used for the same parts as in the preceding FIG. 1. To avoid unnecessary repetition reference is made to the detailed description of the preceding FIG. 1.

FIG. 2 shows a section of a manual control unit 9 and a coupling device 17 comprising a terminal element 21 and a connecting element 22 in the formed or connected coupling state or connected coupling means 15. In the example embodiment according to FIG. 2 the coupling state monitoring device 23 is formed by a contactless detecting sensor device 26 for detecting the presence and/or absence of the connecting element 22 on the terminal element 21. Such a contactless detecting sensor device 26 can comprise for example magnetic or inductive sensors, for example eddy current sensors are suitable. Preferably, optically detecting sensor devices 27 are used for detecting the presence or absence of the connecting element 22.

As also shown in FIG. 2, it is possible that at least one connecting element 22 comprises at least one identifier 28, which comprises or represents identification data about the installation component, machine or machine component assigned to the respective coupling counterpart 16. In this way the at least one coupling state monitoring device 23, 26, 27 can be designed for detecting the identifier 28 and for transmitting the identifier 28 or identification data to the at least one control device 7, 10. As also shown in FIG. 2, for detecting the identifier 28 also an independent reading device 29 can be provided. The at least one control device 7, 10 can then be designed on the basis of the transmitted identifier 28 or identification data for the signal and/or data technical allocation and/or release of supervisory-relevant control commands regarding the respectively identified installation component, machine or machine component.

For example by means of the control system 1 there can be a safe and unambiguous allocation of wirelessly transmitted control commands, so that in case of triggering such a control command via the manual control unit 9, by the control system 1 or a control device 7, 10 of the control systems 1 there can be a secure allocation of the command to the relevant installation component, in the form of addressing. Furthermore, the control system 1 can be designed on the basis of control commands which are valid and executable for the relevant installation component or corresponding supervisory-relevant control commands and for blocking control commands which are not valid and not executable for the respective installation component. The control system 1 can hereby be designed for the continuous monitoring of the identifier or the presence of the identifier 28 via at least one coupling state monitoring device 23 or the independent reading device 29.

As shown in FIG. 2 the at least one coupling state monitoring device 23 or the independent reading device 29 can be formed by a contactless detecting reading device, and the respective connecting element 22 can comprise an identifier 28 detectable by means of the contactless detecting reading device 23, 29. In a preferred embodiment variant the reading device 23, 29 is formed by an optically detecting sensor device 27, and the respective connecting element 22 comprises an identifier 28 readable by means of the optical sensor device 27.

The control system 1 or a control device 7, 10 can then be designed on the basis of the transmitted identifier 28 or identification data for automatic or on demand retrievable output of information relating to the installation component, machine or machine component assigned to the manual control unit 9 relating to the corresponding coupling counterpart 16.

Figure 3:
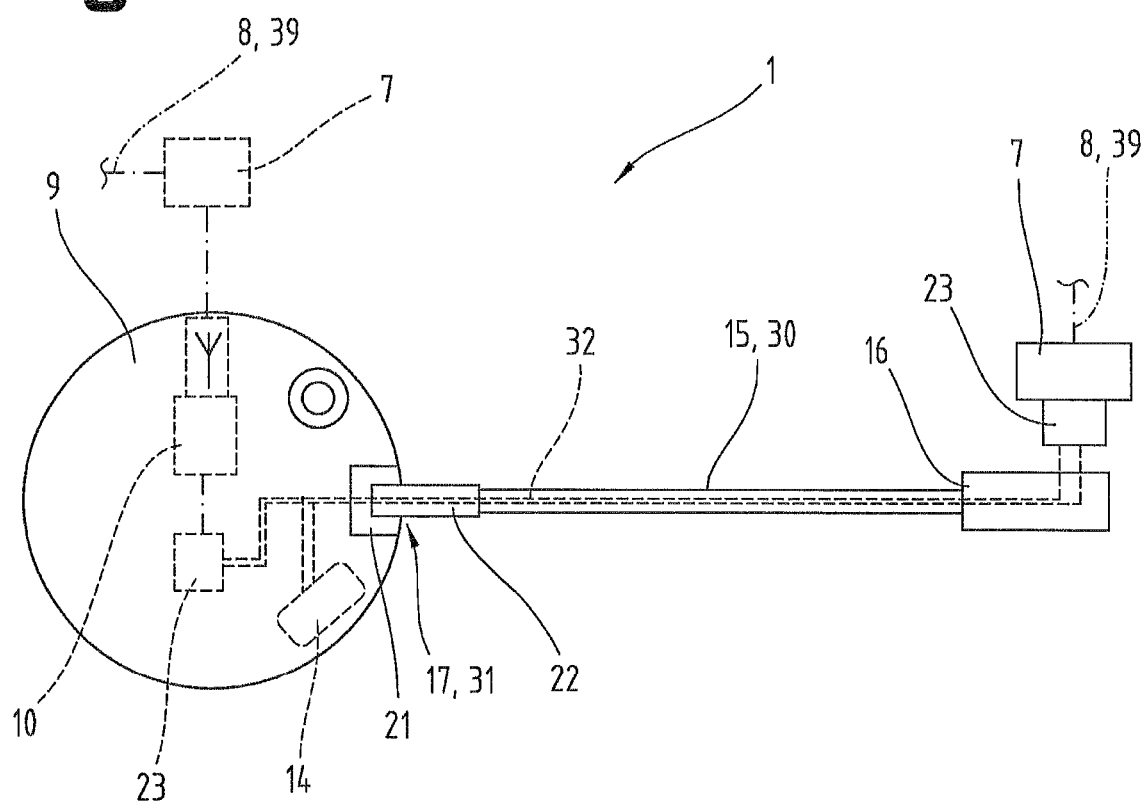
FIG. 3 shows a section of a further embodiment for components of the control system.

FIG. 3 shows a section of a further and possibly independent embodiment of the control system 1, wherein the same reference numerals and component names are used for the same parts as in the preceding FIGS. 1 and 2. To avoid unnecessary repetition reference is made to the detailed description of the preceding FIGS. 1 and 2.

FIG. 3 shows an embodiment variant of the control system 1 in which the coupling means 15 is formed by an electrically conductive cable 30, and the at least one coupling device 17 is formed by an electric plug connection 31. For this purpose the coupling means 15 or the cable 30 comprise electric conductors 32, and the control system 1 in case of a physical link between the manual control unit 9 and the at least one coupling counterpart 16 via the coupling means 15, 30 can be designed for supplying power to the manual control unit 9 and/or for charging the internal power supply unit 14 of the manual control unit 9.

In such an embodiment variant of the coupling means 15 it can be an advantage if the at least one coupling state monitoring device 23 is designed for the continuous monitoring of an electrical connection between the manual control unit 9 and the at least one coupling counterpart 16. As also shown in FIG. 3, a coupling state monitoring device 23 designed in this way can be assigned to the coupling counterpart 16 or the manual control unit 9, or the coupling state monitoring device 23 can comprise components both on the coupling counterpart 16 and the manual control unit 9. The coupling state monitoring device 23 shown in FIG. 3 can hereby be designed for example for continuously checking a current flow through the coupling means 15 or the electric cable 30.

FIG. 4 shows a section of an additional and possibly independent embodiment of the control system 1, wherein the same reference numerals and component names are used for the same parts as in the preceding FIGS. 1 to 3. To avoid unnecessary repetition reference is made to the detailed description of the preceding FIGS. 1 to 3.

In the embodiment shown in FIG. 4 the coupling means 15 comprises at least one signal transmission line 33, so that in a coupling state of the coupling device 17 signals can be transmitted between a coupling counterpart 16 or a control device 7 communication-connected to the coupling counterpart 16 and the manual control unit 9 or the control device 10 of the manual control unit 9. The signal transmission line(s) 33 can hereby be formed for example by light conductors or by electric conductors, wherein of course also combinations of light and electric conductors are possible.

In such an embodiment variant of the coupling means 15 it can be advantageous if the at least one coupling state monitoring device 23 is designed for the continuous monitoring of a signal connection between the manual control unit 9 and the at least one coupling counterpart 16. As indicated in FIG. 4, a coupling state monitoring device 23 of this kind can be assigned to the coupling counterpart 16 or the manual control unit 9 or the coupling state monitoring device 23 can comprise both components on the coupling counterpart 16 and the manual control unit 9. The coupling state monitoring device 23 shown in FIG. 4 can be designed for example for continuously checking a signal technical transmission via the coupling means 15.

In one embodiment of the coupling means 15 with signal transmission lines 33, as shown in FIG. 4, the control system 1 can also be designed for the transmission or delivery of a data technical identifier via the at least one signal transmission line 33 to the manual control unit 9 or the control device 10 of the manual control unit 9. In this case a corresponding data-technical identifier can be stored or saved for example in an electronic storage unit 34 assigned to the coupling counterpart 16. Such a data-technical identifier can in turn comprise identification data about the installation component, machine or machine component assigned to the respective coupling counterpart 16, and the manual control unit 9 or the control device 10 of the manual control unit 9 can be designed on the basis of the transmitted, data technical identifier or identification data for the signal and/or data technical allocation and/or release of supervisory-relevant control commands relating to the respectively identified installation component, machine or machine component.

The control system 1 can in this way for example perform a safe and unambiguous allocation of wirelessly transmitted control commands so that on triggering such a control command via the manual control unit 9 there can be a safe allocation of the command to the relevant installation component, in the manner of addressing, from the control system 1 or a control device 7, 10 of the control system 1. An additional selection step by the user beyond the simple coupling process is hereby unnecessary. This also reliably prevents the incorrect allocation caused by an incorrect user input or operator error, for example when selecting a plurality of machines. Furthermore, the control system 1 can be designed on the basis of the installation component relevant to the release control commands which are valid and implementable for the respective installation component or corresponding supervisory-relevant control commands, and for blocking control commands which are not valid or implementable for the respective installation component.

Furthermore, an embodiment variant of the control system 1 is also possible in which the data-technical identifier or identification data which is transmitted to the manual control unit 9 via the at least one signal transmission line 33 of the coupling means 15 is designed for automatic or on demand retrievable output of information relating to the installation components, machines or machine components assigned to the corresponding coupling counterpart 16 on the manual control unit 9.

In a further, preferred embodiment of the control system 1 in the presence of a physical and signaling connection via the at least one coupling means 15 between the manual control unit 9 and a coupling counterpart 16 there can be a transmission of the supervisory-relevant control commands from the manual control unit 9 or the control device 10 of the manual control unit 9 to the at least one control device 7 via the at least one coupling means 15 or the signal transmission line(s) 33 of the coupling means 15 and via the coupling counterpart 16, as also indicated schematically in FIG. 4. In this way for example the control system 1 can be designed for transmitting control commands by using a real-time capable bus protocol and/or by using a safety-oriented bus protocol. Examples of such bus protocols are EtherCAT, Safety-over-EtherCAT, ProfiNET or Profibus.

In a particularly safe embodiment of the control system 1 with regard to personal safety the manual control unit 9 comprises at least one manually triggered safety switching element 35, as shown in FIG. 5.

FIG. 5 shows a section of an additional and possibly independent embodiment of the control system 1, wherein the same reference numerals and component names are used for the same parts as in the preceding FIGS. 1 to 4. To avoid unnecessary repetition reference is made to the detailed description of the preceding FIGS. 1 to 4.

The safety switching element 35 shown in FIG. 5 on the manual control unit 9 can be formed for example by a so-called, possibly multi-stage enabling switch. Preferably, the manual control unit comprises at least one safety switch element 35 designed in the form of an emergency-off or emergency-stop switch.

By providing such a safety switching element 35 on the manual control unit 9 the control system 1 can be designed with a physical and signaling connection by means of a suitably designed coupling means 15 between the manual control unit 9 and the coupling counterpart 16, and with the manual triggering of the safety switching element 35 for the transmission or delivery of a safety signal via the coupling means 15 and the coupling counterpart 16 from the manual control unit 9 to the at least one control device 7 or to a separately designed safety device 25, as shown schematically in FIG. 5. The safety device can then hereby for example be designed for immediately stopping machine components via safety control lines 40, or for example for the complete shutdown of an installation component or machine.

In particular, the signaling connection by means of the coupling means 15 between the manual control unit 9 and the coupling counterpart 16 can comprise a so-called safety circuit 36, which can be triggered directly by corresponding opener contacts via the safety switching element 35, for example an emergency-off switch. In particular, such a safety circuit 36 can be designed to be a dual circuit, and thus fail-safe, as shown schematically in FIG. 5.

In the embodiment of the control system 1 shown in FIG. 5 it is possible that the at least one coupling state monitoring device 23 is designed for continuously monitoring the proper signal connection between the safety switching element 35 of the manual control unit 9 and the at least one control device 7 or between the safety switching element 35 of the manual control unit 9 and the separately designed safety device 25.

For example, the coupling state monitoring device 23 can comprise a safety circuit 37 on the coupling counterpart 16, which is designed for the periodic short-circuit and cross-fault testing of the proper signal connection between the safety switching element 35 of the manual control unit 9 and the at least one control device 7 or between the safety switching element 35 of the manual control unit 9 and the separately designed safety device 25. Lastly, as also shown in FIG. 5, the coupling state monitoring device 23 can comprise an additional safety circuit 38 formed on the manual control unit 9, which is designed for the continuous monitoring of the periodic short-circuit and cross-fault tests of the safety circuit 37 on the coupling counterpart 16.

The example embodiments show possible embodiment variants, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

The scope of protection is defined by the claims. The description and the drawings should be used to interpret the claims. Individual features or combinations of features of the various shown and described example embodiments can represent in themselves independent solutions according to the invention. The independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure some elements have not been represented to scale and/or have been enlarged and/or reduced in size.

LIST OF REFERENCE NUMERALS 1 control system
2 installation
3 installation component
4 industrial robot
5 processing station
6 transport device
7 control device
8 communication connection
9 manual control unit
10 control device
11 operator
12 output element
13 input element
14 power supply unit
15 coupling means
16 coupling counterpart
17 coupling device
18 holding device
19 winding device
20 drive
21 terminal element
22 connecting element
23 coupling state monitoring device
24 switch contact detection device
25 safety device
26 sensor device
27 sensor device
28 identifier
29 reading device
30 cable
31 plug connection
32 conductor
33 signal transmission line
34 storage unit
35 safety switching element
36 safety circuit
37 safety circuit
38 safety circuit
39 communication connection
40 safety control lines

The invention claimed is:

1. A control system for electrically controlled installations, comprising:
    at least one electronic control device for monitoring and controlling an installation and/or installation components,
    at least one portable, mobile manual control unit for displaying information and for inputting control commands, with an internal power supply unit for the temporary, electrical power supply of the manual control unit,
    a wireless communication connection between the at least one electronic control device and the manual control unit for transmitting information and control commands between the manual control unit and the at least one electronic control device,
    wherein
        at least one form-flexible, material coupling means with a limited maximum longitudinal extension is provided, which coupling means is provided via at least one coupling device activated without the use of tools for the optional creation and disconnection of a physical link between the manual control unit and at least one spatially fixed machine-side coupling counterpart, and
        at least one coupling state monitoring device is designed for the continuous detection and monitoring of a mechanical coupling state of the at least one coupling device and/or for the continuous detection and monitoring of a signaling connection state via the coupling means between the manual control unit and the at least one coupling counterpart,
    wherein the control system is designed for enabling the input of supervisory-relevant control commands,
    wherein the at least one coupling device is formed by a terminal element on the manual control unit and by a connecting element arranged at a longitudinal end of the at least one coupling means and provided for connecting to the terminal element in a form-fitting and/or force-fitting manner without the use of tools, and
    wherein at least one connecting element comprises at least one identifier, which comprises or represents identification data about the installation component assigned to the respective coupling counterpart, and the at least one coupling state monitoring device or an independent reading device is designed for detecting the identifier and for transmitting the identifier or the identification data to the at least one electronic control device, and the at least one electronic control device is designed on the basis of the transmitted identifier or identification data, wherein the transmitted identifier or identification data is for signal and/or data technical assignment and/or release of supervisory-relevant control commands relating to the respectively identified installation component.

2. The control system as claimed in claim 1, wherein the coupling means has a maximum longitudinal extension selected from a range between 2 meters and 25 meters.

3. The control system as claimed in claim 1, wherein at least all of the control commands critical to personal safety are classed as supervisory-relevant control commands.

4. The control system as claimed in claim 1, wherein the coupling state monitoring device is formed by an electric switch contact detection device for detecting a connecting element coupled to the terminal element.

5. The control system as claimed in claim 1, wherein the coupling state monitoring device is formed by a contactless detecting sensor device for detecting the presence and/or absence of the connecting element at the terminal element.

6. The control system as claimed in claim 1, wherein it comprises a plurality of spaced apart machine-side coupling counterparts, which coupling counterparts are assigned locally to the installation components.

7. The control system as claimed in claim 6, wherein a material coupling means is assigned functionally-specifically to at least one of the coupling counterparts, so that the corresponding coupling counterpart and the corresponding coupling means form a functional pair.

8. The control system as claimed in claim 7, wherein the maximum longitudinal extension of a respective coupling means is adjusted with respect to the maximum required or maximum permissible spacing of the manual control unit from the coupling counterpart.

9. The control system as claimed in claim 1, wherein the at least one coupling state monitoring device or an independent reading device is formed by a contactless detecting reading device, and the respective connecting element comprises an identifier detectable by means of the reading device.

10. The control system as claimed in claim 9, wherein the reading device is formed by an optically detecting sensor device, and the respective connecting element comprises an identifier readable by means of the optical sensor device.

11. The control system as claimed in claim 1, wherein it is designed on the basis of the transmitted identifier or identification data for automatic or on demand retrievable output of information relating to the installation component assigned to the corresponding coupling counterpart on the manual control unit.

12. The control system as claimed in claim 1, wherein the coupling means is formed by an electrically conducting cable, and the at least one coupling device is formed by an electric plug connection.

13. The control system as claimed in claim 12, wherein it is designed in the presence of a physical link between the manual control unit and the at least one coupling counterpart via the coupling means for electrically supplying power to the manual control unit and/or for charging the internal power supply unit of the manual control unit.

14. The control system as claimed in claim 12, wherein the at least one coupling state monitoring device is designed for the continuous monitoring of an electrically conducting connection and/or for the continuous monitoring of a signal connection between the manual control unit and the at least one coupling counterpart.

15. The control system as claimed in claim 1, wherein the coupling means comprises at least one signal transmission line.

16. The control system as claimed in claim 15, wherein it is designed in the presence of a physical and signal technical connection via the at least one coupling means between the manual control unit and a coupling counterpart for transmitting the supervisory-relevant control commands from the manual control unit to the at least one electronic control device via the at least one coupling means and the coupling counterpart.

17. The control system as claimed in claim 16, wherein it is designed for transmitting the control commands by using a real-time capable bus protocol and/or by using a safety-oriented bus protocol.

18. The control system as claimed in claim 15, wherein the manual control unit comprises at least one manually triggerable safety switching element, and the control system in the presence of a physical and signaling connection by way of a coupling means between the manual control unit and the coupling counterpart and with the manual triggering of the safety switching element is designed for transmitting a safety signal via the coupling means and the coupling counterpart from the manual control unit to the at least one electronic control device or to a separately designed safety device.

19. The control system as claimed in claim 18, wherein the at least one coupling state monitoring device is designed for the continuous monitoring of the proper signal connection between the safety switching element of the manual control unit and the at least one electronic control device or between the safety switching element of the manual control unit and the separately designed safety device.

20. The control system as claimed claim 1, wherein the at least one coupling means is formed by a signal-technical inactive means.

21. The control system as claimed in claim 1, wherein the at least one coupling counterpart comprises a storage or holding device for the coupling means.

22. The control system as claimed in claim 21, wherein the storage or holding device is formed by a winding device, which comprises a spring stored-energy mechanism or an electric drive for winding the coupling means.

23. A control system for electrically controlled installations, comprising:
at least one electronic control device for monitoring and controlling an installation and/or installation components,
at least one portable, mobile manual control unit for displaying information and for inputting control commands, with an internal power supply unit for the temporary, electrical power supply of the manual control unit,
a wireless communication connection between the at least one electronic control device and the manual control unit for transmitting information and control commands between the manual control unit and the at least one electronic control device,
wherein
at least one form-flexible, material coupling means with a limited maximum longitudinal extension is provided, which coupling means is provided via at least one coupling device activated without the use of tools for the optional creation and disconnection of a physical link between the manual control unit and at least one spatially fixed machine-side coupling counterpart, and
at least one coupling state monitoring device is designed for the continuous detection and monitoring of a mechanical coupling state of the at least one coupling device and/or for the continuous detection and monitoring of a signaling connection state via the coupling means between the manual control unit and the at least one coupling counterpart,
wherein the control system is designed for enabling the input of supervisory-relevant control commands,
wherein the coupling means comprises at least one signal transmission line, and
wherein the control system is designed for transmitting a data technical identifier via the at least one signal transmission line to the manual control unit, which data technical identifier comprises identification data about the installation component, assigned to the respective coupling counterpart, and the manual control unit is designed on the basis of the transmitted identifier or identification data, wherein the transmitted identifier or identification data is for the signal and/or data technical allocation and/or release of supervisory-relevant control commands relating to the respectively identified installation component.

24. The control system as claimed in claim 23, wherein the manual control unit is designed on the basis of the transmitted, data technical identifier or identification data for automatic or on demand retrievable output of information relating to the installation components assigned to the corresponding coupling counterpart on the manual control unit.

25. A control system for electrically controlled installations, comprising:

at least one electronic control device for monitoring and controlling an installation and/or installation components, at least one portable, mobile manual control unit for displaying information and for inputting control commands, with an internal power supply unit for the temporary, electrical power supply of the manual control unit, a wireless communication connection between the at least one electronic control device and the manual control unit for transmitting information and control commands between the manual control unit and the at least one electronic control device, wherein at least one form-flexible, material coupling means with a limited maximum longitudinal extension is provided, which coupling means is provided via at least one coupling device activated without the use of tools for the optional creation and disconnection of a physical link between the manual control unit and at least one spatially fixed machine-side coupling counterpart, and at least one coupling state monitoring device is designed for the continuous detection and monitoring of a mechanical coupling state of the at least one coupling device and/or for the continuous detection and monitoring of a signaling connection state via the coupling means between the manual control unit and the at least one coupling counterpart, wherein the control system is designed for enabling the input of supervisory-relevant control commands, wherein the coupling means comprises at least one signal transmission line, wherein the manual control unit comprises at least one manually triggerable safety switching element, and the control system in the presence of a physical and signaling connection by way of a coupling means between the manual control unit and the coupling counterpart and with the manual triggering of the safety switching element is designed for transmitting a safety signal via the coupling means and the coupling counterpart from the manual control unit to the at least one electronic control device or to a separately designed safety device, wherein the at least one coupling state monitoring device is designed for the continuous monitoring of the proper signal connection between the safety switching element of the manual control unit and the at least one electronic control device or between the safety switching element of the manual control unit and the separately designed safety device, and wherein the coupling state monitoring device comprises a safety circuit on the coupling counterpart, which is designed for periodically performing a short-circuit and cross-fault test on the appropriate signal connection between the safety switching element of the manual control unit and the at least one electronic control device or between the safety switching element of the manual control unit and the separately designed safety device.

* * * * *